(12) United States Patent
Li et al.

(10) Patent No.: US 6,853,514 B2
(45) Date of Patent: Feb. 8, 2005

(54) METHOD FOR MEASURING PES NOISE OF SERVO PATTERNED MEDIA

(75) Inventors: Xinwei Li, Milpitas, CA (US); Koichi Wago, Sunnyvale, CA (US); David Shiao-Min Kuo, Palo Alto, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 283 days.

(21) Appl. No.: 10/167,561

(22) Filed: Jun. 11, 2002

(65) Prior Publication Data

US 2003/0147171 A1 Aug. 7, 2003

Related U.S. Application Data

(60) Provisional application No. 60/355,737, filed on Feb. 5, 2002.

(51) Int. Cl.[7] .............................................. G11B 5/596
(52) U.S. Cl. .................................. 360/77.04; 360/77.08
(58) Field of Search ............................... 360/77.04, 75, 360/77.02, 77.08, 78.09

(56) References Cited

U.S. PATENT DOCUMENTS

| | | | |
|---|---|---|---|
| 5,760,990 A | 6/1998 | Ukani et al. ............. | 360/77.04 |
| 6,128,153 A * | 10/2000 | Hasegawa et al. ....... | 360/77.04 |
| 6,175,472 B1 | 1/2001 | Valent et al. | |
| 6,310,742 B1 | 10/2001 | Nazarian et al. ......... | 360/77.04 |
| 6,331,364 B1 | 12/2001 | Baglin et al. | |
| 6,392,834 B1 * | 5/2002 | Ellis ........................ | 360/77.04 |
| 6,437,936 B1 * | 8/2002 | Chen et al. ............... | 360/77.04 |
| 6,449,116 B2 * | 9/2002 | Morris et al. ............ | 360/77.04 |
| 6,556,371 B1 * | 4/2003 | Ottesen et al. ........... | 360/77.04 |
| 6,624,963 B2 * | 9/2003 | Szita ....................... | 360/77.04 |
| 6,654,198 B2 * | 11/2003 | Ooi et al. ................ | 360/77.04 |
| 6,678,108 B2 * | 1/2004 | Smith et al. ............. | 360/77.04 |

* cited by examiner

*Primary Examiner*—Sinh Tran
*Assistant Examiner*—James L Habermehl
(74) *Attorney, Agent, or Firm*—Morrison & Foerster LLP (57) ABSTRACT

A method for measuring servo pattern irregularity and other servo information of pre-patterned servo media mounted on a spindle with the center of the pre-pattern tracks off center from the axis rotation of the spindle. An actuator is stepped radially while measuring the PES signals from the servo sectors of at least one highly eccentric track to form a cross track profile of the PES signals for each sector. A mathematical algorithm removes step measurement error from the data. A second mathematical algorithm removes non-repeatable random noise from the data. The amount of phase-in that radially aligns the respective cross track profiles is computed. Servo pattern written-in repeatable runout is determined by unwrapping the phase-in values to form a periodic curve.

13 Claims, 9 Drawing Sheets

METHOD FOR MEASURING PES NOISE OF SERVO PATTERNED MEDIA

CROSS-REFERENCE TO RELATED APPLICATIONS

This application claims benefit of U.S. provisional patent application Ser. No. 60/355,737, filed on Feb. 5, 2002, which is herein incorporated by reference.

BACKGROUND OF THE INVENTION

1. Field of the Invention

The invention relates to field of disk drives and more particularly to the writing of servo tracks onto the disks during manufacture.

2. Description of the Related Art

Disk drive servo tracks are today written onto a blank magnetic disk after the disk drive has been substantially assembled. While there are many known methods for writing servo tracks onto a blank magnetic disk, one of the most common methods include the use of a laser interferometer to control a picker that attaches to an actuator arm. The picker steps the arms across the disk. A head, mounted on the arm writes the servo patterns.

As disk drive areal density continues to increase, pre-patterned servo fields are proposed. These fields may be formed by high precision lithographic methods. See, e.g., U.S. Pat. No. 6,331,364 B1. A mask exposes areas to be demagnetized. An ion bombardment through the mask reduces the coercivity of the disk magnetic material, making it unable to retain magnetization. Arranging magnetized and demagnetized areas forms a servo pattern.

A problem occurs when pre-patterned media is mounted onto a spindle. It is typically not possible to precisely center the media patterns with respect to the axis of rotation of the spindle. This results in the center of the servo patterns being spaced a small distance from the axis of rotation of the spindle. As a result, the servo patterns form an eccentric "circle" about the spindle.

Figure 1:
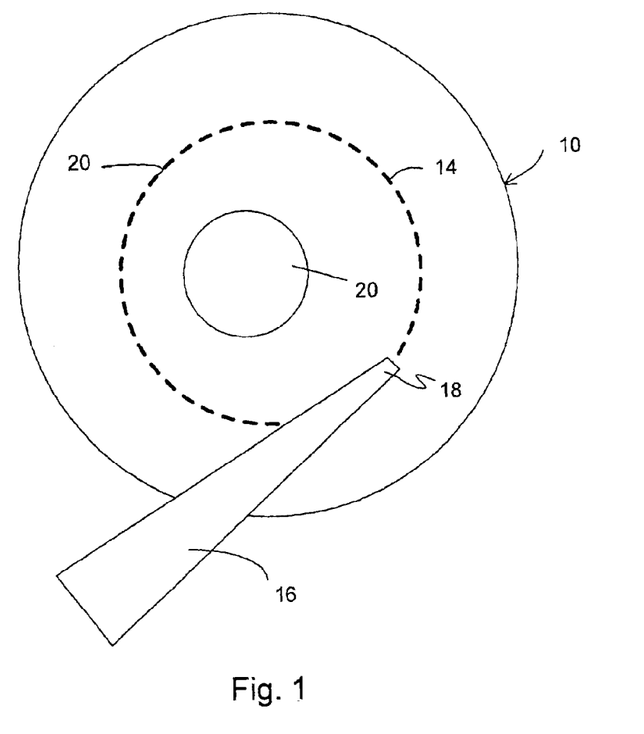
FIG. 1 is a plan view of a disk mounted off center on a spindle together with a representation of an actuator that mounts a magnetic head on its distal end.

FIG. 1 illustrates the problem. It shows, greatly exaggerated, a preformatted disk 10 mounted on a spindle 12 with the center of the preformatted servo pattern 14 (comprising a plurality of spaced servo bursts 20) offset from the center of the spindle 12. Also shown in the figure is a hypothetical actuator arm 16, upon the distal end 18 of which is typically mounted a magnetic transducer head (not shown in figure) that reads the magnetic information from the disk 10 as it rotates.

Figure 2:
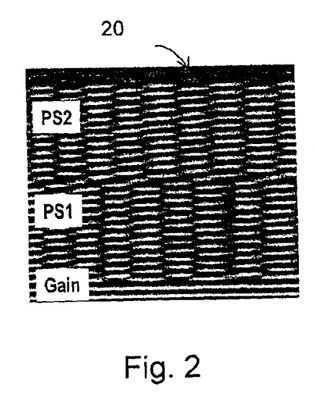
FIG. 2 is a representation of a servo sector having three fields, a gain field and two servo bursts PS1 and PS2.

Servo patterns can be of many varieties all of which enable the servo system of a disk drive to "follow" a track of information, while either reading or writing to it. The most common servo pattern in use in today's disc drives is the so-call "quadrature" servo burst. See e.g., FIG. 3 of U.S. Pat. No. 5,760,990, for a typical quadrature pattern. FIG. 2 illustrates such a "quadrature" servo burst 20. In FIG. 2, the servo burst is comprised of three separate areas, labeled in the figure as Gain, PS1 and PS2. These areas follow each other in the "track" direction. Each is comprised of a plurality of radially aligned patterns. One of patterns, labeled Gain, operates to calibrate the gain of a servo read circuit. The Gain patterns are radially continuous. The other two patterns are the servo bursts themselves, PS1 and PS2. The servo bursts, PS1 and PS2, patterns are not continuous. They are rather formed of two sets of adjacent patterns. A magnetic head reading, for example, pattern PS1, will generate a "null" signal when it is aligned equally over each of the offset patterns of PS1. The same is true when the head tracks down the center between the two offset patterns of PS2.

Figure 3:
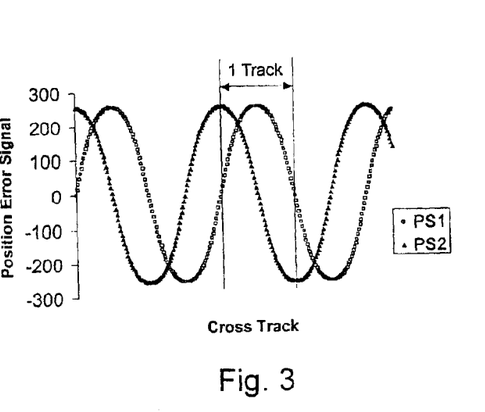
FIG. 3 is across track profile of the position error signals read from a PS1 and PS2 respectively.

The PS1 and PS2 patterns in turn are radially offset from each other by 90 degrees. This is best illustrated by reference to FIG. 3, a chart showing the PES signals read from each of these patterns as the head is traversed in the radial direction. Each of the points in FIG. 3 represents the signal generated by an entire PS1 or PS2 burst at a particular radial location as that pattern passes under a magnetic head. The PS 1 and PS 2 waveforms, although they look very much like a sine waves, contain second and higher order components.

Figure 4:
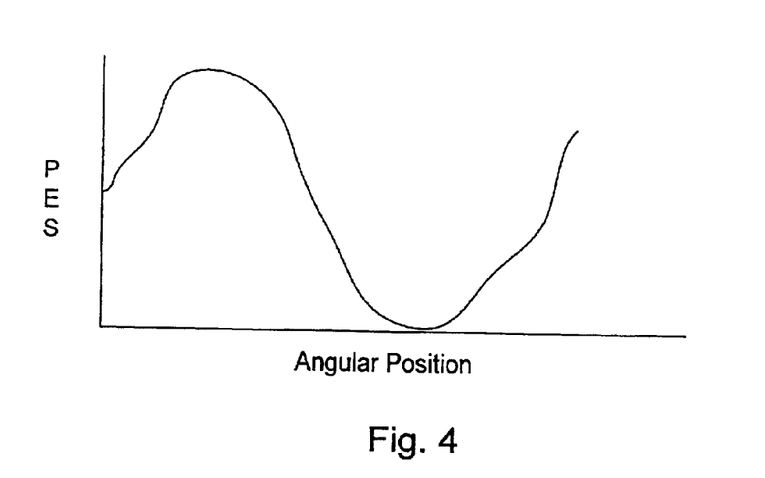
FIG. 4 as a chart of a PES signal read by a fixed actuator from a disk having a relatively small repeatable runout.

A PES signal, generated by either PS1 or PS2 in the track dimension, is illustrated in FIG. 4. Assuming disk to spindle eccentricity was not too severe, i.e., eccentricity did not exceed one track, the track-wise PES signal is similarly a sine like periodic waveform. The signal varies from a sine wave because it contains components attributable to the repeatable run out of the servo burst pattern vs. the axis rotation of the spindle. Other than for eccentricity, these errors are caused by errors in the formation of the servo patterns. The errors are typically caused by mechanical vibrations, air turbulence, or electrical noise if the patterns are written magnetically. Poor lithographic processes cause the errors if lithographic processes write the servo patterns.

Figure 5:
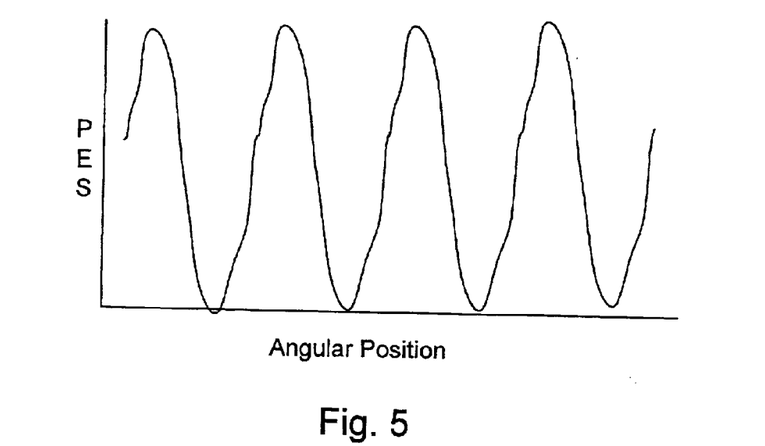
FIG. 5 is a chart of the PES signal read by fixed actuator from a disk having a slightly larger repeatable runout.

When the degree of misalignment between the center of the servo patterns 14 and the center of rotation of a spindle 12 exceeds one track, the PES signal may exhibit more than one period as the disk spins one revolution and the transducer is held fixed, i.e., "stationary." The number of repetitions is according to the number of servo tracks that pass under the stationery transducer as the disk rotates. For example, if the eccentricity of the disk is only slightly greater than one track, the PES read back signal could appear as illustrated in FIG. 5. The peaks correspond to track "center" as its passes under the transducer during one revolution.

Figure 6:
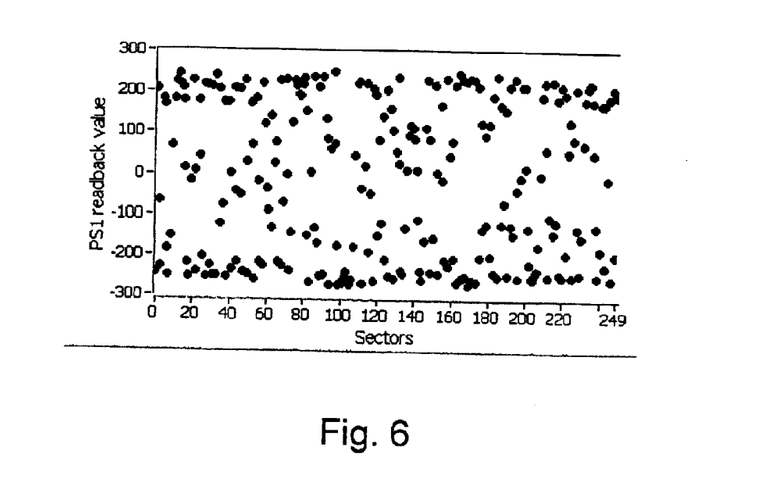
FIG. 6 to the chart of the PES signals read by fixed actuator from a disk having a relatively large repeatable runout.

Today's disk drive track density approaches 100,000 tracks per inch. In this environment, the number of tracks offset between a servo pattern center and the center of rotation of the spindle will typically exceed 10 or more tracks. The PES signal read from a stationery transducer will contain a large number of peaks. An exemplary pattern is illustrated in FIG. 6.

In the figure, the y-coordinate represents PS1 read back amplitude (in arbitrary units). The x-coordinate represents the sector number of a servo burst. The illustrated disk drive track has 250 servo sectors.

The 250 points are fairly scattered and show no discernible pattern.

When a disc drive has pre-patterned servo, it is important to characterize and control the degree of servo pattern irregularity (the repeatable and non-repeatable errors) so that a disk drive may function. Excessive irregularity can prevent the disk drive from tracking at all.

In prior systems, repeatable runout compensation schemes were developed to aid in tracking disks having a high degree irregularity. Repeatable runout was measured and feed forward into the servo-positioning signal during operation. One such system for measuring repeatable run out is described in U.S. Pat. No. 6,310,742 B1. Such prior systems for measuring, however, will not work or take far too much time to measure when the servo track eccentricity (runout) far exceeds one track such as one finds with pre-patterned servo media.

Therefore, there is a need to develop a system to measure servo track repeatable runout of pre-formatted servo media, both for the purpose of disc media quality control and to provide for the purposes of "feeding forward" the runout into the disk drive's servo system.

SUMMARY OF THE INVENTION

The invention comprises a method for measuring servo pattern irregularity and other information that is highly accurate, fast and free from noise introduced from the measurement system. The invention comprises stepping the actuator in the radial direction while measuring the PES signal in all servo sectors. The error in these measurements caused by "noise" in the measurement system is removed using two sequentially employed algorithms, resulting in a highly accurate picture of the PES signal.

The PES noise in the measurement is caused by two major factors: the first is attributable to the step inaccuracy of the actuator. The other is caused by random errors due to air turbulence and electrical noise. The step error is removed by an algorithm that iteratively determines how much offset is necessary to reduce the misalignment of the measured radial patterns from an "average" radial profile. Repeating the measurements a number of times and then estimating from the measurements the PES signal at an infinite number of measurements remove the random PES noise.

Once measurement noise has been removed from PES measurements, the quality of the servo patterns is determined from the degree of "noise" remaining. Also, the repeatable radial runout itself is determined by phase "unwrapping" the "phase offsets" of the measurements from each sector until a periodic signal is reproduced.

DETAILED DESCRIPTION OF THE PREFERRED EMBODIMENTS

The preferred method for measuring runout is to mount the pre-patterned disc onto a spin stand spindle as illustrated in FIG. 1. A piezoelectric motor (not shown) is attached to the actuator 16. This motor steps the actuator in equal increments. Perfect step accuracy is not required, thus the expense of the stepper system can be reduced.

A typical disk for a disk drive will have on the order of 250 servo sectors. Each of the servo sectors typically is broken down into several sections, included among which would be Gain, PS1 and PS2 (see FIG. 2) for a so-called quadrature servo pattern. When these servo bursts are read by a magnetic head and decoded by a servo system, the servo system generates so-called PES signals that are an indication of how far the head is away from a so-called track center, which typically is thought of as the line dividing adjacent servo patterns of either PS1 or PS2 in FIG. 2. As illustrated in FIG. 3, these PES signals are periodic in the radial dimension. With a quadrature servo pattern, each PES period spans two tracks. A track center is located at a point where the PES signal from PS1 is changing the fastest, which is that the zero crossing the figure.

When tracks density is very high, any misalignment between the virtual center of the servo tracks and the axis rotation of the spindle will cause the track eccentricity to be significantly greater than one track, assuming the actuator is fixed as of the spans as illustrated in FIG. 1. In fact, it can be expected to be on the order of 100 tracks. However, to properly measure repeatable runout, it is not necessary to provide a radial scan that spans the entire eccentricity. But it is preferred to scan more than one PES period in the radial direction. In the preferred embodiment, the number of measurements is chosen such as to span at least five PES periods.

An additional factor is that the number measurements per period should be sufficient to well-define the cross track profile of the PES signal. In the preferred embodiment, the steps dimensions are chosen so that at least 40 measurements are taken for each PES. In the preferred embodiment of five PES periods and at least 40 measurements per period, the number of measurements is 200.

In the preferred embodiment, the actuator is initially positioned at an arbitrary point on the disk. The disk is rotated and the head reads the PS1 and PS2 sections of the respective servo bursts and the servo the modulator generates PES signals from each servo bursts that are then recorded. It is important to note that the actuator is not controlled by the servo system while the measurements are taken. It is instead held stationary in a fixed position.

To reduce random timing noise from the PES measurements, each of the servo bursts is measured 10 times for each radial step. These measurements are all recorded and then later averaged by an algorithm that will be discussed below.

Figure 7:
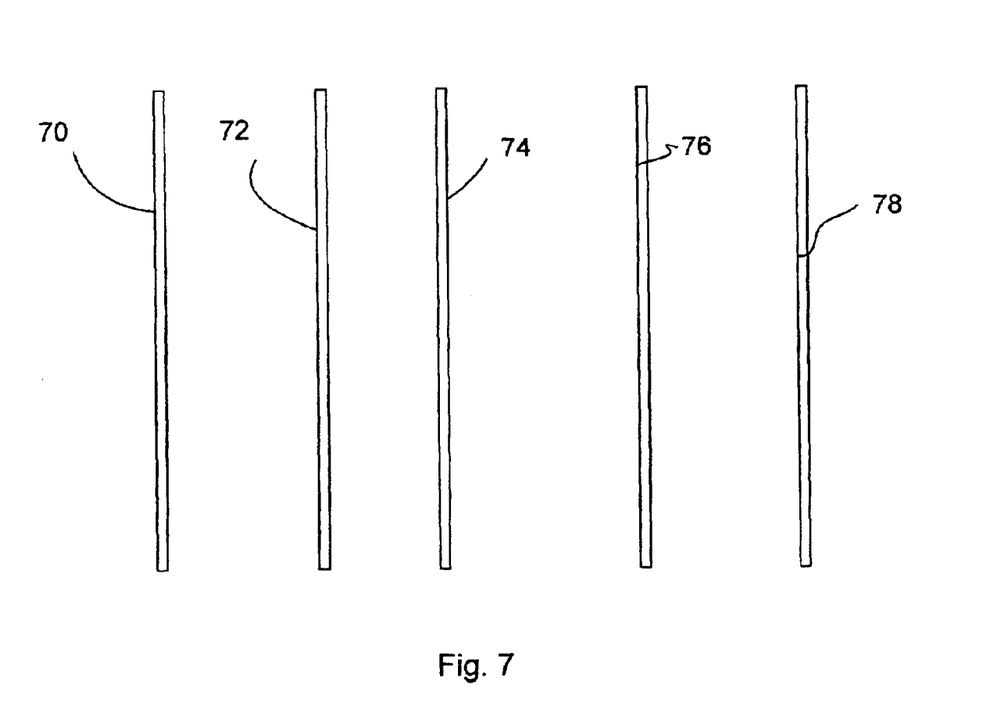
FIG. 7 is an illustration of step offset caused by misalignment of the actuator as it is radially stepped.
Figure 8:
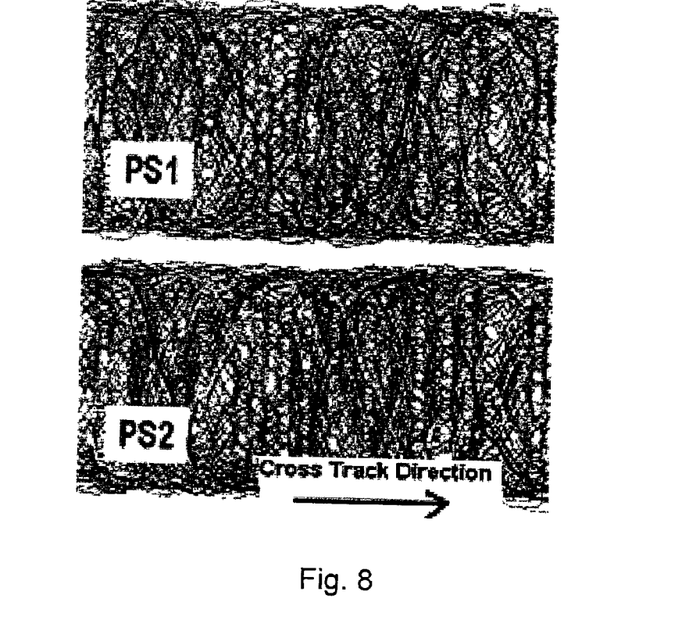
FIG. 8 charts the radial profiles of all 250 sectors for both PS1 and PS2.

The measured PES data contains testing related errors, as illustrated in FIGS. 7 and 8. FIG. 7 illustrates exemplary transducer read positions of five nominally uniform steps. However, due to error, step 74 is short, resulting a smaller distance between steps 72 and 74 than other steps, for example, between steps 70 and 72. If thereafter the next step is large enough to get the actuator back to where it should have been, the distance between step 74 and step 76 will be larger than the nominal step distance or size, which in the figure this illustrated as the distance between steps 76 and 78.

FIG. 8 illustrates in separate charts for PS1 and PS2 the cross track PES signals of all 250 servo sectors superimposed on each other. The signals from PS1 and PS2 are 90 degrees out of phase with each other. FIG. 8 also shows that each cross track profile is not smooth, but contains zigzags that are common among all the sectors. This illustrates that the zigzags are related to the head stepping positions being non-uniform.

Current disc drive track density is about 100 KTPI. In order to evaluate the pattern uniformity to 1% of track pitch accuracy, the head stepping position error and the spindle non repeatable runout ("NRRO") combined should not be greater than $\frac{1}{100}$K*1%=2.54 nm. This level of accuracy cannot be achieved using conventional techniques without very expensive tester hardware. The present invention permits less accurate measurement equipment because it employs an algorithmic approach to removing measurement error. Conventional spin stand measurement equipment can be used to measure the repeatable and non-repeatable runout to the accuracy levels required.

Removing Step Measurement Error

The preferred embodiment provides an algorithm to correct most of the equipment related noises, such as the stepping error and the spindle NRRO, to provide a measure of the true PES pattern uniformity using conventional equipment to an accuracy of 1% at 100 KTPI.

Figure 9:
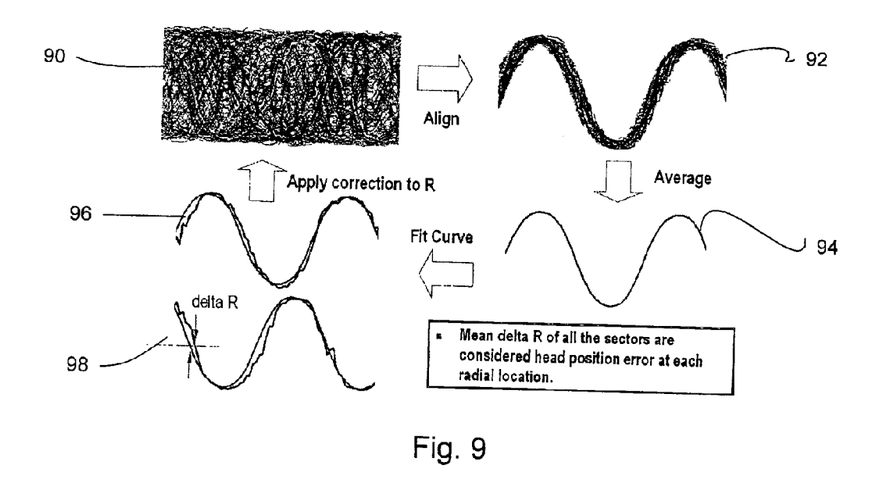
FIG. 9 illustrates the essential steps of the preferred algorithm to remove measurement step error from the PES measurements.

The algorithm to remove step error from the measurements is briefly described in connection with FIG. 9. The figure illustrates an iterative algorithm that removes the step error of the PES measurements. The step error is illustrated in the PES profile chart 90 located in top-left portion 90 of the figure. The algorithm first aligns the cross track profiles for each sector to be substantially in phase with each other. This is illustrated by the "fuzzy" curve 92 located at the top right hand portion of FIG. 9. The algorithm next averages data for each sector and computes, using a Fourier transform, an average cross track profile. This average cross track profile is illustrated by the relatively smooth curve 94 located at the bottom right of the figure. This average cross track profile is then "curve fit" with the respective measured data for each sector. This is illustrated by alignment of the smooth curve with the jagged curves at reference 96 in the figure. Once the average cross track profile has been aligned, the radial distances between the measurements and the average cross profile is then determined. This is illustrated at reference 98 in the figure. This process is repeated for every sector. After the distances between the measurements and average cross track profile for all sectors have been calculated, a mean radial offset, delta R, is computed for each step. This delta R is representative of step error and each step.

This value, delta R, is then fed back into the algorithm by adjusting the assumed radial measurement locations for each step. The starting radial measurement locations assumed that each step was uniform. The algorithm is then repeated.

After approximately 10 iterations, the average change in delta R from one iteration to the next becomes small. When this point is reached, the last determined delta R for each step is approximately equal to the step offset.

Figure 10:
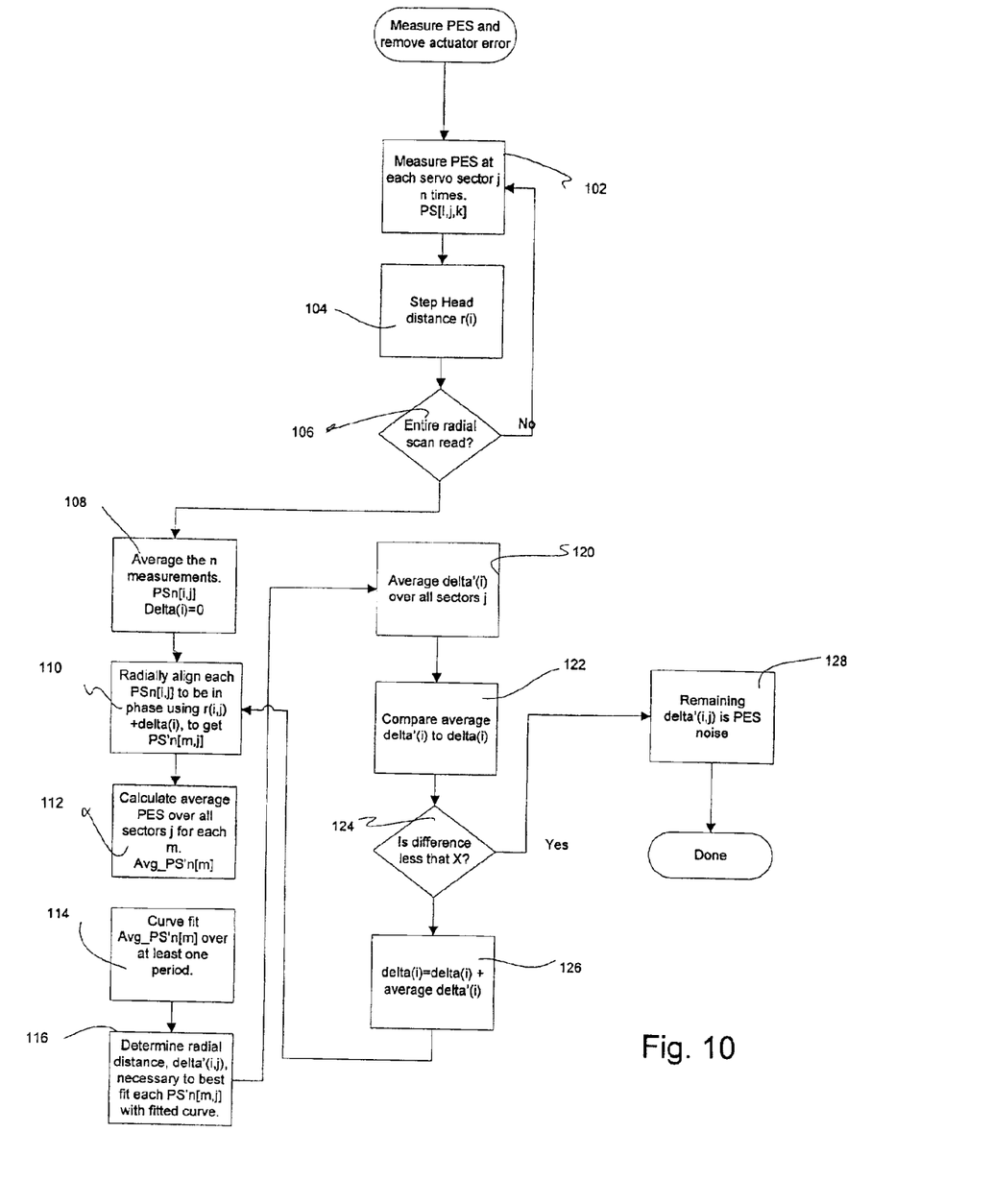
FIG. 10 is a flow diagram of the preferred algorithm to remove step error from the PES measurements.

This algorithm is further described in conjunction with the flow chart of FIG. 10. The actuator is positioned at an arbitrary location on the disk, illustrated in FIG. 1, preferably somewhere near the center of the recording area of the disk. While the actuator is held steady, the PES at each sector is measured (102). The measurements are recorded. The measurements are repeated and recorded a number of times sufficient to reduce, by averaging, measurement inaccuracies related to timing inaccuracies, variations in spindle rotational velocities, and the like. In the preferred embodiment, the number of measurements is 10.

The head is then stepped, 104, a distance "r," which is intended to be a uniform distance but which is actually a non uniform distance due to step error. The algorithm then determined whether the number of steps has reached the total number steps, which in the preferred embodiment is 200. The measurement of the PES of all sectors 10 times is then repeated at each step.

After measurements are taken at every step, the data is then subjected to a mathematical process that removes step error. In the following description mathematical notation is used to describe the measurements taken and mathematical processes employed.

Each of the data collected in the measurement step 102 for each PES section, either PS1 or PS2, is denoted as a member of a three dimensional matrix PS[i, j, k], wherein "i" is the radial scan or step location index, ranging from 0 to the scan_range−1;

"j" is the sector number, ranging from 0 to the total_ sectors−1;

"k" is the revolution index number at each step "i", ranging from 0 to the total_revolutions−1.

The first step in the mathematical process is to define constants and initialize variables. The constants correspond a preferred embodiment that employs a radial scan of 200 steps, on a disk that has 250 servo sectors, and wherein 10 measurements made and recorded at each step and servo sector. The algorithm may also comprise an interpolation step that chooses a point that is a linear interpolation between two measurement points. This simplifies subsequent calculations.

The distance between each interpolation point is set to exactly an integer number for each PES period. Initially, the number of actuator steps that span one PES period is unknown. The number of steps that span a PES period is determined from measured data. And therefore the number of interpolation points does not necessarily correspond to the number of radial steps. For this reason the number interpolation points for the purposes of the algorithm is initially set to a number substantially greater than the number of steps.

The constants are initialized as follows:

> scan_range = 200;
> total_sectors = 250;
> total_revolutions = 10;
> total_interpolation = 240.

As discussed above, the 200 steps span approximately five PES periods. Therefore, in terms of a PES period, each step size is 2 Π (the number of radians in a PES period)/(actual number of steps per PES period), i.e., step_size=2 Π/approx. 40. The actual number of steps per period is determined from the measurements.

Step size may be determined using the relationship of 2 tracks per PES period, where track pitch is expressed in nanometers. If the disc drive has 100KTPI, the track pitch is 254 nanometers. Each PES therefore is 508 nanometers in length. Each step, therefore, has a nominal dimension of 508/40 or 12.7 nanometers, assuming, for the moment, that 40 steps span one period.

The algorithm also preferably includes an interpolation function. The interpolation "step size" is set to an integer, 40 in the preferred embodiment, number of point per PES period. The physical interpolation "step size" depends, therefore, upon the radial distance actually spanned by a PES period. As previously discussed, in order that the entire measurement scan have corresponding interpolation points, the number of interpolation points is set to a number sufficient to normally exceed the scan length. Thus, preferably, interpolation_step=2Π/40 and the number of interpolation steps=240.

Figure 11:
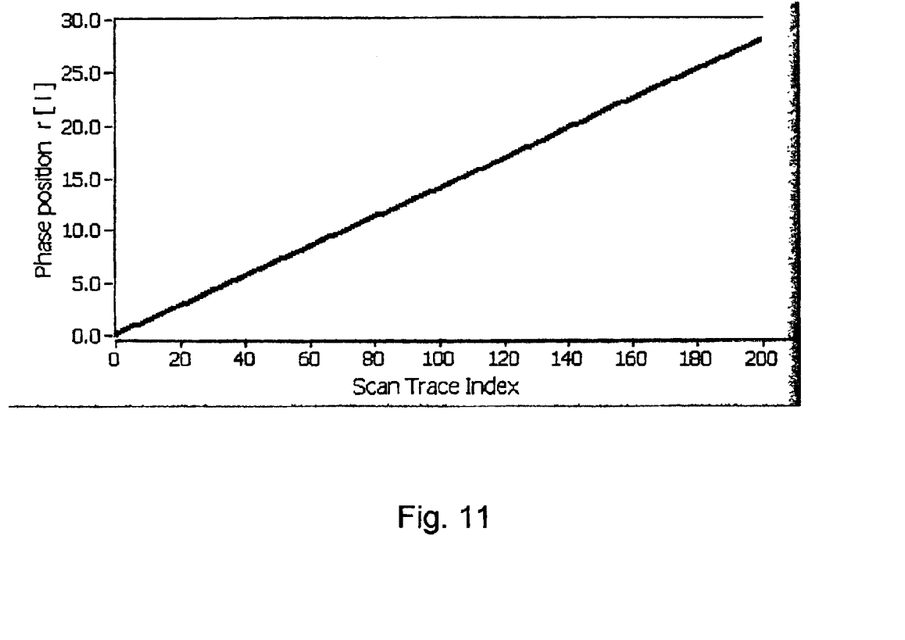
FIG. 11 is a chart of the relevant phase position of each radial step.

Next, each measurement for each sector is associated with an "assumed" radial location r[i]. This initial assumed location is the start location, 0 radians, plus the number of steps times the step size, again, expressed in radians. FIG. 11 is a chart of r[i] vs. step or "i" from an example wherein the number of steps per PES period was 44.86. At radial step number 200, the assumed r[i] is 28.01239 radians.

This initial location assignment for each measurement assumes that step error, delta[i] is zero. In subsequent iterations, delta[i] is set to the step error determined after an iteration of the algorithm. In this manner, subsequent iterations assign assumed radial locations of the measurements closer to their actual locations.

Next, at step 108, the n measurements at each step and sector are averaged to form a matrix of "averaged" measurements, PSn[i, j]. As explained earlier, this averaging removes some measurement "noise," particularly that caused by transients.

Next, at step 110 in FIG. 10, the amount of phase offset to bring the profile of each sector to be in phase alignment is calculated. The phase offset assumes that each cross track profile has a sine-like profile. The phase offset for each sector is calculated as follows:

For j=0 to total_sectors−1 (total 250 sectors), fit scan_range (total 200 steps) number of (x, y) points (r[i]+delta_r[i], PSn[i, j]), i=0 to scan_range−1, by general linear fit with function $$A[j]+B[j]\sin(x)+C[j]\cos(x)=A[j]+Sqrt(B[j]^2+C[j]^2) \sin(x+\phi[j]),$$

in which $$\sin(\phi[j])=C[j]/Sqrt(B[j]^2+C[j]^2),$$

$$\cos(\phi[j])=B[j]/Sqrt(B[j]^2+C[j]^2), \text{ and}$$

$$\phi[j]=\arctan(C[j]/(B[j]), \text{ with values ranging between } [-\Pi, \Pi].$$

Figure 12:
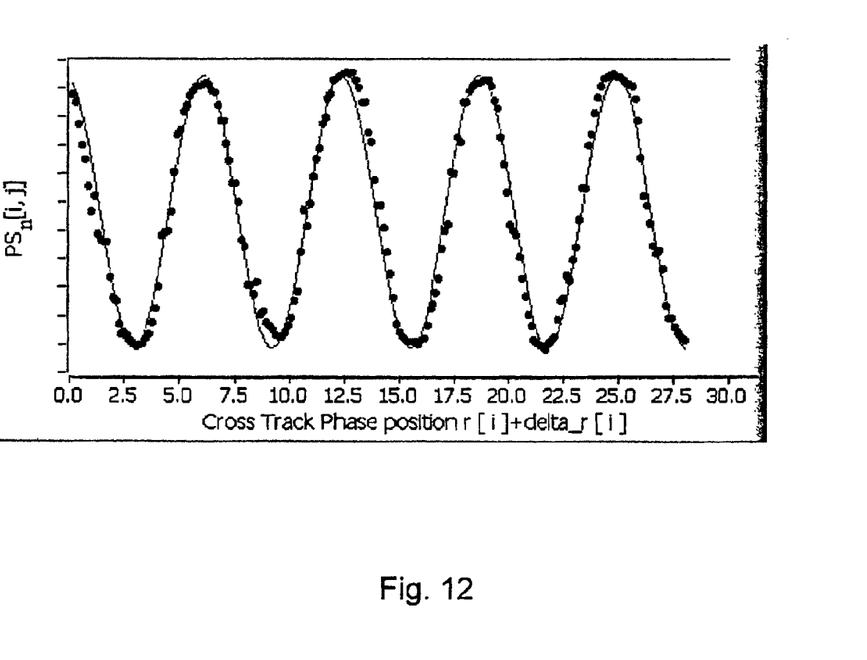
FIG. 12 is a chart comparing PES measurements vs. a fitted curve of an exemplary sector.

FIG. 12, illustrates a fitted curve, the solid line, for one PES, such as from PS1, for one sector vs. the measured data, the dots. The "phase-in" φ[j] of the fitted curve is 1.77 radians. As illustrated, the Figure shows five PES peaks over the radial scan.

Next, the measured PES profiles for each sector are interpolated, but offset by the respective phase-in values φ[j]. This results in interpolated points substantially "aligned" with each other radially. The formula is as follows:

For j=0 to total_sectors−1
For m=0 to interpolation_range−1
Interpolate from curve (r[i]+delta_r[i]+φ[j], PSn[i, j]), in which i is the variable,
at location (r_interpolation[m]−Π)
to obtain PS'n[m, j], with out of range interpolations being ignored.

Figure 13:
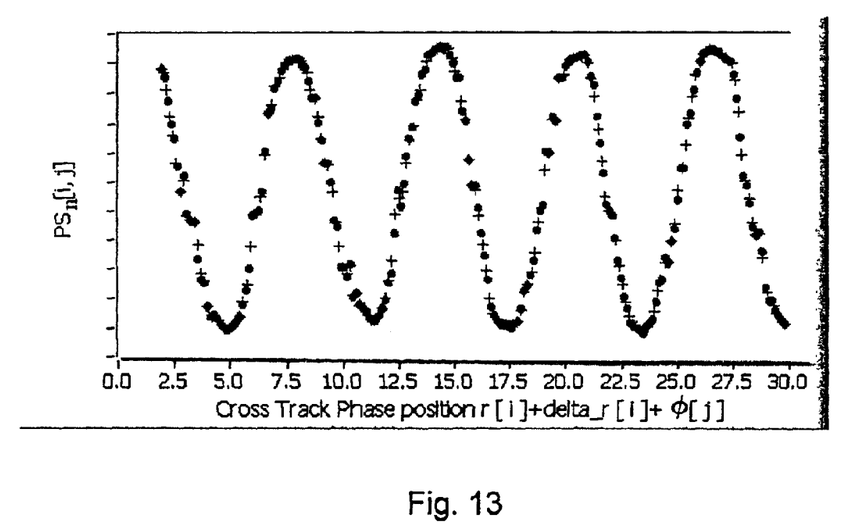
FIG. 13 is a chart of interpolation points determined from the exemplary cross track profile which is offset sufficiently to bring it to into phase alignment and with the other sectors.

FIG. 13 compares the original data PSn[i, j], the solid dots, of the example sector with the interpolated points PS'n[m, j], represented as crosses. Each of the data points has the phase offset, φ[j], of the fitted curve, 1.77 radians in the example, added to r[i]+delta_r[i].

Figure 14:
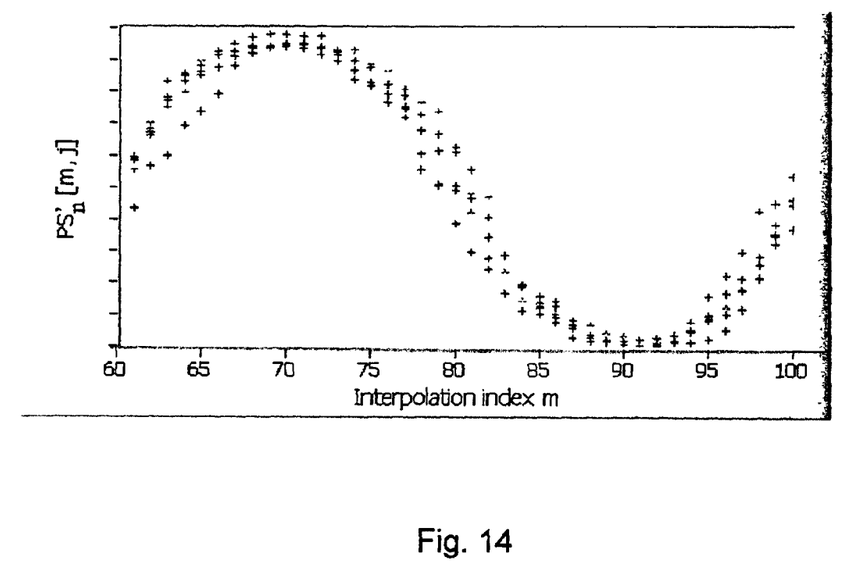
FIG. 14 is a chart of and overlaying of several interpolation cross track profiles taken from a central portion of the interpolation index.

After all sectors are interpolated, the interpolation points comprise substantially radially aligned "cross track profiles" as illustrated in FIG. 14. The figure shows one period of the interpolation points for a number of different sectors taken from a central portion of the interpolation scan. This illustration corresponds to aligned cross track profiles 92 from FIG. 9.

Next, the interpolation points are used to calculate the average PES curve from aligned "cross track profiles" of all sectors. Thus, for m=0 to interpolation_range−1

$$\text{Average\_PS}'_n[m] = \frac{1}{\text{total\_sectors}} \sum_{j=0}^{\text{total\_sectors}-1} PS'_n[m, j]$$

Figure 15:
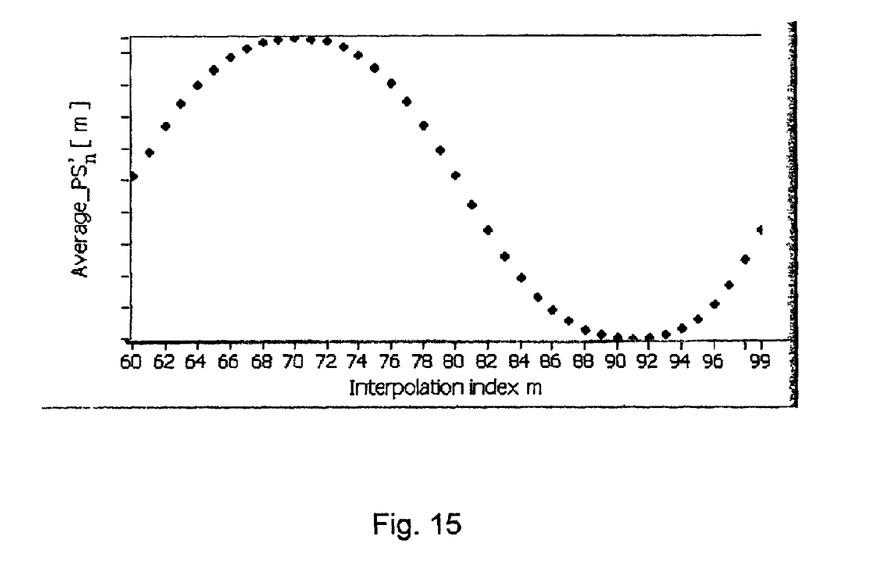
FIG. 15 is a chart illustrating the average the interpolation points from of all sectors from a central portion of the interpolation index.

FIG. 15 illustrates the averaged interpolated data over the same period illustrated in FIG. 14.

Next, this data is formed into a curve using a Fourier transformation. E.g.,

Average PES curve =

$$\sum_{n=1}^{\infty} (a_n \sin(nx) + b_n \cos(nx)) = A1\sin(x+\theta1) + A2\sin(2(x+\theta2)) +$$

$$A3\sin(3(x+\theta3)) + A4\sin(4(x+\theta4)) + A5\sin(5(x+\theta5)) + \ldots$$

In the preferred embodiment, a Fast Fourier Transform ("FFT") is employed over one or more exact periods located in the center of the averaged cross track profile. The FFT amplitudes, A1, A2, etc. are preferably normalized and the phase angles, θ1, θ2, etc. are shifted to make A1=1 and θ1==0. Usually, five orders (up to sin(5×)) are sufficient to almost fully describe the curve.

Next, at steps 114 in FIG. 10, this Fourier transform of the averaged cross track profile is curve fit to the cross track profile data, (r[i]+delta_r[i], PSn[i, j]), at each sector j. Mathematically, with the parameters C0[j] and C1[j] to be fitted, $$f_j(x)=C0[j]+C1[j]^*(A1\sin(x+\theta1+\phi[j])+A2\sin(2(x+\theta2+\phi[j]))+A3\sin(3(x+\theta3+\phi[j]))+A4\sin(4(x+\theta4+\phi[j]))+A5\sin(5(x+\theta5+[j]))+\ldots)$$

Figure 16:
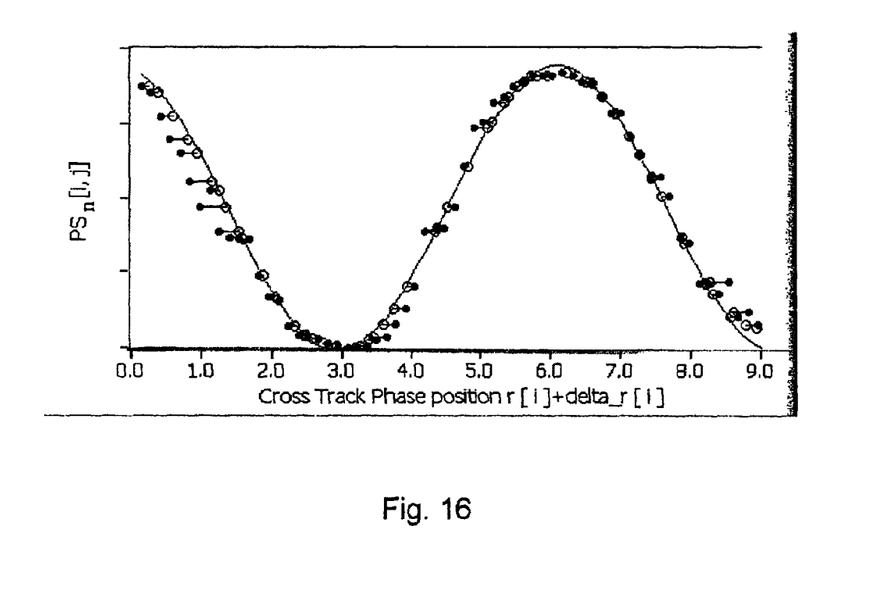
FIG. 16 is a chart illustrating a solid curve, which is the Fourier, transform of the averaged interpolation points, be measured PES data, and the distances between the measured data and the Fourier transform curve.

This function $f_j(x)$ is shown in FIG. 16 as the smooth curve.

Next, at step 116 in FIG. 10, the fitted curve, $f_j(x)$, is compared with the cross track profile data, (r[i]+delta_r[i], PSn[i, j]), to determine the radial distance, delta_r'[i, j], between the data, the solid dots in FIG. 16, and the fitted curve at each measurement point. This distant, delta_r'[i, j], shown as the horizontal lines connecting the solid dots and the hollow dots on the fitted curve, is approximately equal to dy[i, j]/k[i, j], where dy[i,j] is approximately equal to the distance between the data and the curve in the y direction, and k[i, j] is the first order derivative of $f_j(x)$ at x=r[i]+delta_r[i]. Thus, $k[i, j] = C1[j](A1 \cos(x+\theta 1+\phi[j])+2*A2 \cos(2(x+\theta 2+\phi[j]))+3*A3 \cos(3(x+\theta 3+\phi[j]))+4*A4 \cos(4(x+\theta 4+\phi[j]))+5*A5 \cos(5(x+\theta 5+\phi[j]))+ \ldots)$ The calculation of delta_r'[i, j] above used a first order approximation. A second order approximation is better, but more complex. Some care is needed to treat k [i, j] at near zero conditions. One can either set delta_r'[i, j] to zero or limit its range.

Next, the average radial offset, delta_r[i], is determined by averaging the radial offsets, delta_r'[i, j], across all the sectors.

$$\text{delta\_r}[i] = \text{delta\_r}[i] + \frac{1}{\text{total\_sectors}} \sum_{j=0}^{\text{total\_sectors}-1} \text{delta\_r}'[i, j]$$

The algorithm is preferably repeated, beginning at step 110 in FIG. 10, by recomputing the phase offset φ[j]), but this time with the assumed radial location being r[i]+delta_r[i]. This results in a delta_r[i] that is an improved measure of the true step offset.

The process continues until the average of $$\text{delta\_r}'[i, j], \frac{1}{\text{total\_sectors}} \sum_{j=0}^{\text{total\_sectors}-1} \text{delta\_r}'[i, j],$$

is small or zero. Usually, total of 10 iterations produces very good results.

Figure 17:
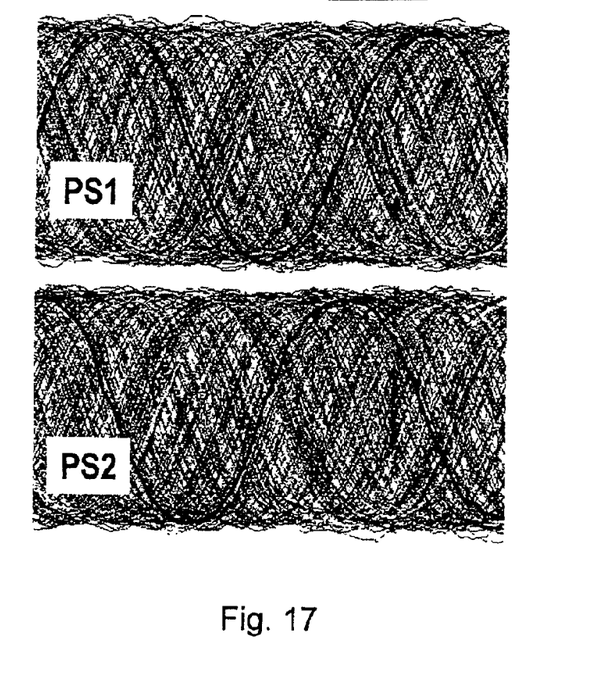
FIG. 17 illustrates the overlaid cross track profiles of the PES signals from both PS1 and PS2 after the above process removes step error.

FIG. 17, illustrates the cross track PES profiles from PS1 and PS2 using r[i]+delta_r[i] as the radial coordinate. After the correction algorithm, the profiles are substantially smoother. But not completely so. The remaining noise is caused by short-term, random measurement noise and by non-uniformity in the PS1 and PS2 patterns themselves.

Removing NRRO

After successfully removing mean position errors of the head on a time scale longer than the measurement time at each location r[i] using the algorithm described above, short time scale head position error, spindle non repeatable runout ("NRRO"), and electrical and other random errors can be further removed.

The total variance of measured PES noise is the sum of the variance contributions from the PES pattern and from random measurement noise. An average of n revolutions at each measurement step reduces the random noise variance to 1/n of its original value, but does a not change the real pattern noise. The relationship between measured PES noise, random noise and real pattern noise is illustrated by the formula:

$$\text{Measured}(PES \text{ Noise})^2 = \text{real Pattern}(PES \text{ Noise})^2 + \frac{(\text{Random Noise})^2}{n}$$

The zero intercept of a plot of Square of Measured PES Noise of (r[i]+delta_r[i], PSn[i, j]) vs. 1/n, is the real "pattern" noise squared.

PES noise can be measured in many ways. One way is to use the average of standard deviations of the distance of the measurements, PSn[i, j], from the averaged curve. Another is to use the standard deviation of the delta_r'[i, j] also derived, as above described, from the measured data.

With the same data set PS[i, j, k], when n is different, the calculated position correction delta_r[i] will be different. At one radial location, when disc spins, head radial position will change randomly around a center location. In each disc revolution, the head position errors at all sectors have a distribution with some width. Averaging data from different revolutions will effectively reduce this width. When the number of measurements, n, goes to infinity, the averaging effect will reduce the width to zero. At the same time, other random noise (mechanical positioning noise, electrical noise and random fly height noise, etc.) will be removed as long as averaging from revolution reduces their distribution.

There are 10 revolutions of data at each radial location, PS[i, j, k] with k=0 to 9 for 10 revolutions.

$$PS_n[i, j] = \frac{1}{n}\sum_{k=0}^{n-1} PS[i, j, k],$$

is the averaged measurement data. The value of n in this formula are varied from 1, 2, and up to 10. (When n<10, only part of the data collected is used.) For each PSn[i,j] thus obtained, after the stepping error correction algorithm, a PES noise number is calculated as described above. This number is employed the above formula relating Measured PES noise, real Pattern noise and Random Noise to do the extrapolation to infinite measurements.

Written in Repeatable Runout

Another output from the algorithm described in connection with FIG. 10 is that written-in repeatable run out (WIRRO) can be calculated precisely. Once the WIRRO is calculated, it may be used by disk drive servo systems to enhance tracking capability. One such method is to feed forward the repeatable runout into the servo system. See, e.g., U.S. Pat. No. 5,585,976.

WIRRO is calculated by unwrapping the so-called "phase-in" φ[j] of each cross track profile. After obtaining the final "phase-in" φ[j] values from each sector, FIG. 18, WIRRO is calculated by "phase un-rapping" these "phase-in" values. Because the PES cross track profile has a periodic function with period 2 Π, the "Phase-in" φ[j] of a particular sector's cross track profile is equivalent to φ[j, n]=φ[j]30 2 n Π. This relationship is used to "unwrap" the phase-ins of each sector into a smooth, continuous curve made up with points φ[j, n[j]]. This curve has a single "down track" period, i.e., the curve has one period, 2Π, as the disk spins one revolution.

These "phase-in" φ[j] values are un-wrapped by an iterative algorithm that chooses the next unwrapped point to be that point closest to a linear extrapolation from the previous two points. The algorithm iterates until this process produces a periodic curve having the same "phase-in" value at both its beginning and at its end, i.e., that is continuous.

Given the calculated φ[j], j=0 to total_sectors−1 the algorithm begins as follows:

Starting from $\phi[0, 0]$ and $\phi[1, 0]$, and with n[0] and n[1] are assumed to be zero, the value of n[2] for $\phi[2, n[2]]$ is determined to be the integer that makes $\phi[2, n[2]]$ closest to $2\phi[1, 0]-\phi[0, 0]$. Thus, n[2]=Integer quotient of $(2\phi[1, 0]-\phi[0, 0]-\phi[2, 0])/(2\Pi)$, where the quotient is rounded to the nearest integer.

The algorithm continues, with each successive point determined from the current phase-in value and the linear extrapolation of the prior two values. If the value for sector j, n[j], has been calculated, then n[j+1]=Integer quotient of $(2\phi[j, n[j]]-\phi[j-1, n[j-1]]-\phi[j+1, 0])/$ $(2\Pi)$, where the quotient is rounded to the nearest integer.

The unwrapped values for all sectors n[j] are calculated using this method. This may, or may not, result in a periodic signal depending on whether the start and ending values for n[j] are equal. If n[0]=0=Integer quotient of $(2\phi[\text{total\_sectors}-1, n[\text{total\_sectors}-1]]-\phi[\text{total\_sectors}-2, n[\text{total\_sectors}-2]]-\phi[0, 0])/(2\Pi))$, and n[1]=0=Integer quotient of $(2\phi[0, 0]-\phi[\text{total\_sectors}-1, n[\text{total\_sectors}-1]]-\phi[1, 0])/(2\Pi))$, where the quotient is rounded to the nearest integer, is not TRUE, then the starting 2 points $\phi[0, n[0]]$ and $\phi[1, n[1]]$ actually do not have equal n values. The whole algorithm is repeated with new starting points, i.e., $\phi[1, 0]$ and $\phi[2, 0]$, etc., until the periodicity check has been satisfied.

Figure 18:
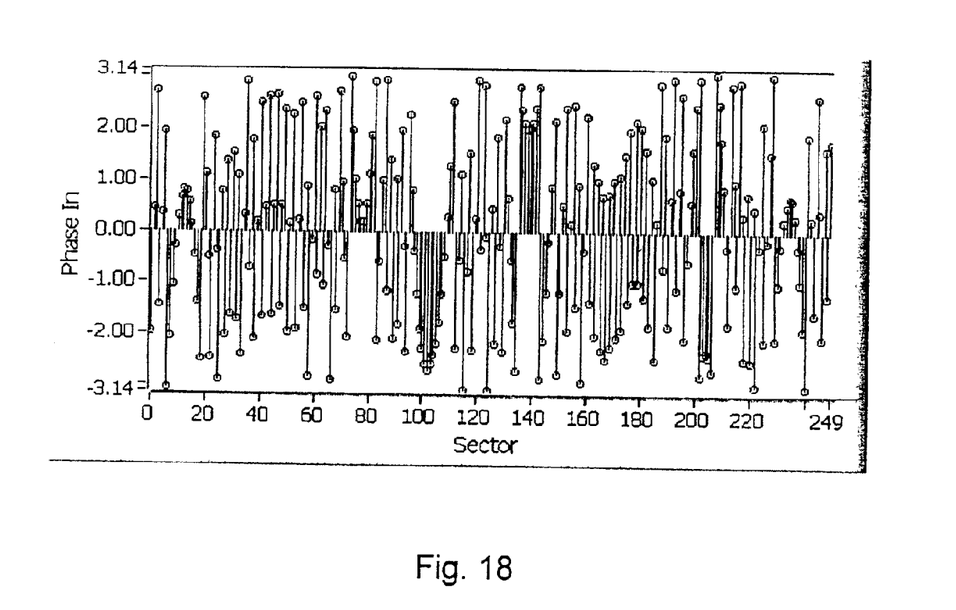
FIG. 18 is a chart of the phase-in values of the PBS cross track profiles for each sector.
Figure 19:
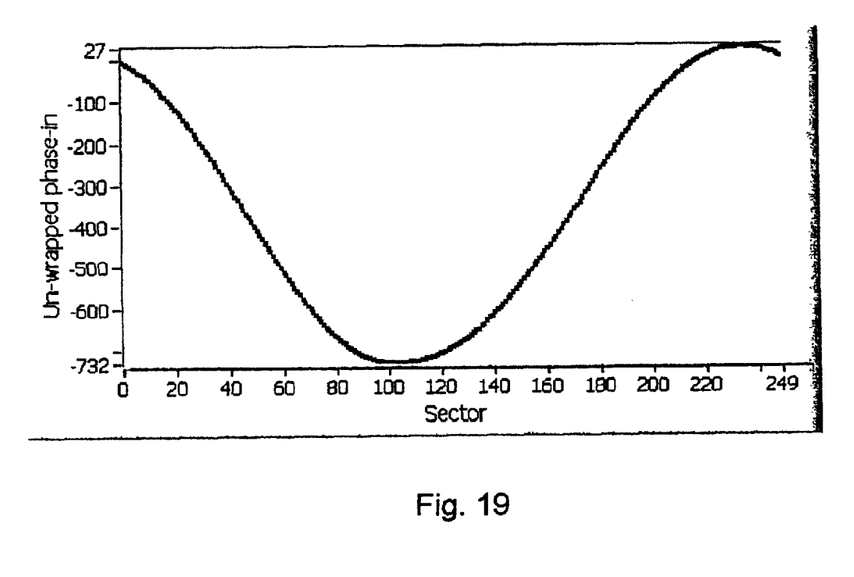
FIG. 19 is a chart of the unwrapped phase-in PES values, which is the repeatable runout.

An example of un-wrapped phase $\phi[j, n[j]]$ calculated from the phase-in data of FIG. 18 is shown in FIG. 19. This curve is smooth and is periodic over all sectors j. It is the disc runout in radians, wherein $2\Pi$ is the number of radians in one PES cross track period, which in the case of a quadrature servo patterns, spans two tracks.

The above description of the preferred embodiments is not by way of limitations on the scope of the appended claims. In particular, those of ordinary skill yards may substitute other means of stepping the actuator or measuring PES. Invention may also be used with servo patterns other than quadrature servo patterns.

We claim:

1. A method of determining actuator position error in the measurement of servo position error signals ("PES") from a magnetic disk having pre-patterned sector servo data pattern written into a plurality ("j") of servo sectors defining substantially circular tracks whose centers are offset from the axis of rotation of a spindle onto which the disk is mounted, each servo sector generating a PES signal in a read-back magnetic transducer that is periodic in the radial, cross track dimension, comprising:
    a) stepping a magnetic transducer across a disc in i nominally equal radial increments, each step being offset from a nominal step by an actuator position error, where the number of increments is sufficient to span at least one PES period;
    b) at each step, measuring the PES at each of the servo sectors n times, where n is a predetermined number greater than zero;
    c) for each PES measurement, calculating an average of the n times measurements at each step to form an i×j matrix of average PES measurements, each set of average measurements for each sector j having substantially identical cross track profiles, each cross track profile offset from the initial cross track profile by a phase difference, $\Phi[j]$;
    d) computing a radial phase offset $\Phi[j]$ of each cross track profile for each sector from the average PES measurements assuming, initially, that each step was of a nominal size;
    e) realigning the average PES measurements to have substantially the same phase; and averaging the realigned PES measurements by step;
    f) decomposing, using a Fourier transformation, the averaged measurements to determine an average cross track profile;
    g) comparing the average cross track profile to the measurements to determine the radial distance between the two for each PES measurement;
    h) averaging the distances by step to determine an average radial distance for each step;
    i) updating a offset for each step by adding to the offset the average radial distance, the offset initially being set to zero; and
    j) repeating steps (d) through (i) by adding the respective offsets to the receptive steps radial measurement locations distance until the largest average radial distance is less than a predetermined number; wherein the resultant offset is the actuator position error at each step.

2. A method for removing random noise from the measurement of position error signals, comprising:
    a) measuring PES by steps n times according to steps a and b of claim 1;
    b) forming a plurality of sets of averaged PES measurements as provided in step c of claim 1 by determining an average PES measurement by varying the number of measurements used to form the average,
    c) determining a step offset for each set of averaged PES measurements as provided in steps d through j of claim 1,
    d) calculating an average standard deviation of the differences between the averaged PES measurements and the average cross track profile from the final realigned average PES measurements;
    e) plotting the square of the average standard deviation vs. the inverse of the number of measurements used to form the averaged PES measurements;
    f) wherein the square of the actual PES noise is the value of the plot at n=∞.

3. The method of claim 1 wherein said method of realigning the average PES measurements includes determining an interpolation point between respective measurements and further wherein said step of averaging the realigned PES measurements comprises averaging the interpolation points.

4. The method of claim 1 wherein said step of comparing the average track profile to the measurements to determine the radial distance between the two for each PES measurement, comprises:
    dividing the difference between the PES measurements and the average track profile by the first differential of the average track profile.

5. A method for determining the written in repeatable runout of the servo pattern, comprising:
    a) measuring PES by steps and determining step offsets according to claim 1;
    b) phase unwrapping the final phase offsets $\Phi[j]$ to form a continuous periodic signal having one period.

6. The method for determining the written in repeatable runout according to claim 5 wherein the phase unwrapping step comprises:

determining Φ[j,n]=Φ[j]+2n[j]Π from Φ[j], wherein n[j] is determined by
a) setting n[O]=n[1]=0;
b) from j=1 to the total number of sectors−1, determining n[j+1]=nearest integer of (2Φ[j,n[j]]−Φ[j−1,n[j−1]]−Φ[j+1,0]/(2Π);
c) determining whether n[0] derived from nearest integer quotient of (2Φ[total_sectors−1, n[total_sectors−1]]−Φ[total_sectors−2, n[total_$_{sectors}$_2]]−Φ[0, 0])/(2Π) equals to 0 and n[1] derived from nearest integer quotient of (2Φ[0, 0]−Φ[total_sectors−1, n[total sectors−1]]−Φ[1, 0])/(2Π) equals to 0; and if it is not, repeating steps a and b, but starting at n[1]=n[2]=0, and beginning the determination of subsequent n[j+1] from j=2; and
d) repeating the incrementation of the starting sector j until Φ[j,n[j]] form a continuous periodic signal having one period.

7. A disk drive servo system, comprising:

a memory for storing repeatable runout compensation values that are the resultant step offset of claim 1, step j); and means for feeding forward said compensation values into a disk drive servo system; wherein said compensation values are determined according to the method of claim 5.

8. Apparatus for measuring servo pattern irregularity, comprising:

means for stepping an actuator across a disc drive disc having a plurality of pre-patterned servo sectors while measuring the PES signal from each servo sector; and means for removing measurement error from the measurements.

9. Apparatus according to claim 8 wherein said means for removing measurement error comprises means for removing step error from the measurements.

10. Apparatus according to claim 8 wherein said means for removing measurement error comprises means for removing random error from the measurements.

11. Apparatus according to claim 8 further comprising means for determining repeatable runout from the measurements.

12. Apparatus according to claim 11 further comprising a disc drive servo system means for feeding-forward said repeatable runout.

13. A method of determining an actuator position error in a measurement of servo position error signals from a magnetic recording disk having pre-patterned sectors of servo data, comprising determining an average cross track profile by computing a radial phase offset of each cross track profile for each of said sectors, realigning average PES measurements to have substantially the same phase, averaging realigned PES measurements, and decomposing averaged PES measurements using a Fourier transformation.

* * * * *